Patented Mar. 3, 1925.

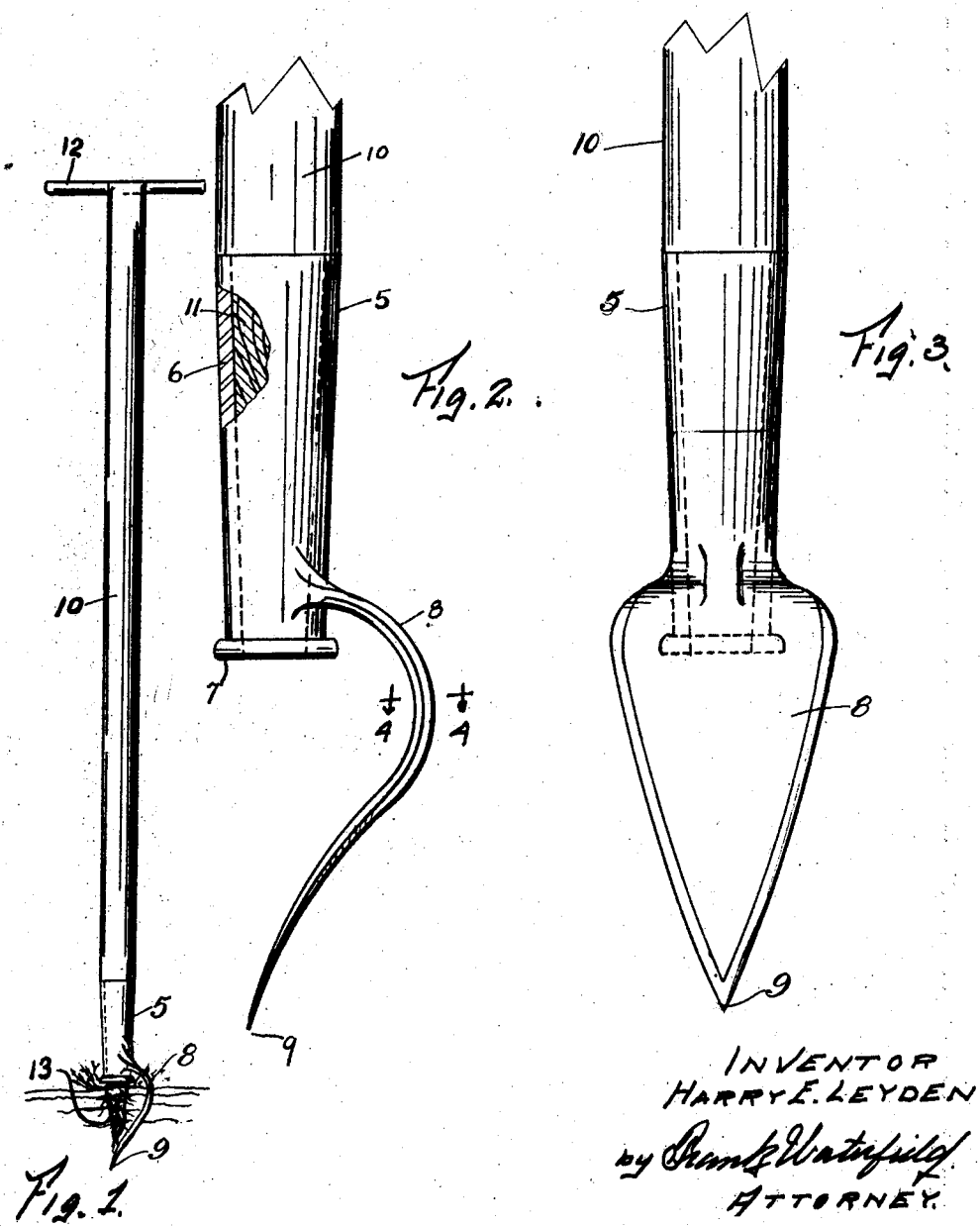

1,528,157

UNITED STATES PATENT OFFICE.

HARRY E. LEYDEN, OF FRESNO, CALIFORNIA.

WEED EXTRACTOR.

Application filed June 11, 1924. Serial No. 719,259.

*To all whom it may concern:*

Be it known that I, HARRY E. LEYDEN, a citizen of the United States, and resident of Fresno, in the county of Fresno, State of California, have invented certain new and useful Improvements in Weed Extractors, of which the following is a specification.

My invention relates to a hand tool by means of which isolated weeds and the like may be extracted from lawns or pastures with a minimum amount of time and labor, and the object thereof is to provide a device of the above character which will be cheap to manufacture and simple and efficient in operation.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 1 is a side elevation of my device in its operative position.

Fig. 2 is a greatly enlarged side elevation, partly broken away, of my device.

Fig. 3 is a right hand elevation of Fig. 2.

Fig. 4 is a section on the line 4—4 of Fig. 2.

Referring to the drawings, my device comprises a tubular socket 5, the aperture 6 therein being tapered slightly from the top to the bottom. The lower end of socket 5 terminates in an annular flange 7 the purpose of which will be hereafter explained. Secured to socket 5, near its lower end and preferably integral, is the cutting blade 8 which, in side elevation, curves outwardly from socket 5 and then downwardly and inwardly and terminates in a point 9 slightly beyond the vertical center through socket 5, as best shown in Fig. 2.

In rear elevation, as best shown in Fig. 3, the opposite edges of member 8 are curved outwardly for a short distance and then extend downwardly and inwardly towards each other and terminate in point 9.

A detachable handle 10, preferably of wood, has its lower end 11 reduced in size and tapered to snugly fit the aperture 6 in socket 5. A cross bar or handle 12 is secured upon the upper end of handle 10.

In the use of my device, as best shown in Fig. 1, the blade 8 will be pressed into the ground at the side of the weed 13 it is desired to remove, until it assumes the position shown in Fig. 1, the peculiar curvature of member 8 acting to draw the point of said member below the weed and to cause flange 7 to rest upon the ground. The device is then given one complete rotation by means of cross bar 12, when the weed and a portion of the earth surrounding the same will be severed, and an upward movement of the device, by means of cross bar 12, will extract the device together with the weed.

Having described my invention, what I claim is:

1. A weed extractor comprising a socket; a curved blade extending from said socket, said blade extending outwardly from said socket and being curved downwardly and inwardly and terminating in a point just beyond the vertical center of said socket; and means to rotate said blade.

2. A weed extractor comprising a socket; a curved blade extending outwardly a short distance from the lower end of said socket and then being curved downwardly and inwardly and gradually decreasing in width from the top to the bottom and terminating in a sharpened point, the edges of said blade being sharpened; a handle mounted in said socket to extend upwardly therefrom; and means to rotate said handle and socket.

3. A weed extractor comprising a socket; a cutting blade secured at one end to the lower end of said socket being curved to extend outwardly, then downwardly and inwardly, to a distance below the lower end of said socket and gradually decreasing in width from the top to the bottom; a handle mounted in said socket adapted to be rotated to cause said blade to extract a weed from the ground.

4. A weed extractor comprising a socket; a cutting blade secured at one end to said socket, said blade being so constructed and arranged that when the point thereof is pressed into the ground at the side of a weed it will draw said socket to a position immediately above said weed, the point of said blade extending to a point beyond the vertical center of said socket, whereby when said socket is rotated said blade will sever said weed and withdrawal of said socket will extract said weed from the ground; and means to rotate and withdraw said socket and blade.

In witness that I claim the foregoing I have hereunto set my hand this 10th day of May, 1924.

HARRY E. LEYDEN.